United States Patent
Moretto

(10) Patent No.: US 7,678,282 B2
(45) Date of Patent: Mar. 16, 2010

(54) METHOD OF DETERMINATION OF THE CONDITIONS OF EXHAUSTION OF A FILTERING CARTRIDGE FOR FILTERING CARAFES WITH REPLACEABLE CARTRIDGE AND CARAFE OPERATING IN COMPLIANCE WITH SUCH METHOD

(75) Inventor: Maurizio Moretto, Vicenza (IT)

(73) Assignee: LAICA S.p.A., Barbarano Vicentino (IT)

( * ) Notice: Subject to any disclaimer, the term of this patent is extended or adjusted under 35 U.S.C. 154(b) by 34 days.

(21) Appl. No.: 11/859,730

(22) Filed: Sep. 21, 2007

(65) Prior Publication Data

US 2008/0035582 A1 Feb. 14, 2008

Related U.S. Application Data

(63) Continuation of application No. 10/895,319, filed on Jul. 21, 2004, now Pat. No. 7,294,277.

(30) Foreign Application Priority Data

Apr. 8, 2004 (EP) .................................. 04008513

(51) Int. Cl.
*C02F 1/00* (2006.01)
*B01D 35/14* (2006.01)

(52) U.S. Cl. ..................... 210/746; 210/86; 210/482; 73/304 R; 222/36

(58) Field of Classification Search ................. 210/473, 210/482, 746, 85, 86, 87; 73/861.02, 861.08, 73/861.09, 304 R, 304 C; 222/36, 39
See application file for complete search history.

(56) References Cited

U.S. PATENT DOCUMENTS

| | | | |
|---|---|---|---|
| 5,131,277 A | 7/1992 | Birdsong et al. | |
| 5,145,575 A | 9/1992 | Burrows | |
| 5,328,597 A * | 7/1994 | Boldt et al. ................... | 210/87 |
| 5,458,766 A | 10/1995 | Ehara et al. | |
| 5,900,138 A | 5/1999 | Moretto | |
| 6,074,550 A | 6/2000 | Hofmann et al. | |
| 6,224,751 B1 | 5/2001 | Hofmann et al. | |
| 7,107,838 B2 | 9/2006 | Chai et al. | |
| 2005/0229700 A1 | 10/2005 | Chai et al. | |

FOREIGN PATENT DOCUMENTS

EP 1 589 325 A2 10/2005
WO WO 01/94893 A 12/2001

OTHER PUBLICATIONS

European Search Report in EP Application 04 00 8513, dated Sep. 17, 2004.

* cited by examiner

*Primary Examiner*—Matthew O Savage
*Assistant Examiner*—Paul J Durand
(74) *Attorney, Agent, or Firm*—Kristina Castellano; Castellano PLLC

(57) ABSTRACT

A method of determination of the conditions of exhaustion of a filtering cartridge for filtering carafes with replaceable cartridges is described, in which an initial identification of impedance of the water to be filtered is provided for in order to consequently calculate an important parameter for definition of the efficient lifespan on the filtering cartridge. Furthermore a carafe operating in compliance with such method is also described.

27 Claims, 4 Drawing Sheets

US 7,678,282 B2

METHOD OF DETERMINATION OF THE CONDITIONS OF EXHAUSTION OF A FILTERING CARTRIDGE FOR FILTERING CARAFES WITH REPLACEABLE CARTRIDGE AND CARAFE OPERATING IN COMPLIANCE WITH SUCH METHOD

CROSS REFERENCE TO RELATED APPLICATIONS

This application is a continuation of U.S. application Ser. No. 10/895,319 filed on Jul. 21, 2004 (now U.S. Pat. No. 7,294,277), which claims priority to European application No. 04008513.6 filed on Apr. 8, 2004, both of which are hereby incorporated by reference in their entirety.

FIELD OF THE INVENTION

The object of the present invention is to provide a method to determine the conditions of exhaustion of a filtering cartridge for filtering carafes with a replaceable cartridge, and to provide a carafe operating in compliance with such method.

BACKGROUND

Filtering carafes including a system of determination of the conditions of exhaustion of a filtering cartridge are familiar, for example by U.S. Pat. No. 5,900,138 of the same applicant.

In filtering carafes the problem of pointing out to the user the need to replace the cartridge once it is exhausted is very common. Typically, exhaustion of the cartridge is monitored through the use of two parameters, the number of filtering cycles carried out from initial activation and/or the amount of time from said activation. It is clear that the filtering material contained in the cartridge progressively loses its capacity of purifying water through use and time.

Even if these two factors represent efficient parameters in order to evaluate the conditions of efficiency of the filtering cartridge, the indication based on these factors only may turn out to be unsatisfactory. There is in fact a third important factor for calculation of the lifespan of the cartridge: the quality of the water to be filtered and the concentration of pollutants that it contains.

The filtering power of the cartridge does not vary only according to the quantity of water treated but also according to its quality.

The filtering carafes available up until today include a counting system of the filtering cycles carried out from initial activation of the cartridge, identified for example according to the counting of the number of accesses to the first water collection basin to be filtered. In some cases there is also an auxiliary counting system which counts the amount of time from the initial activation of the cartridge, compared with a time limit of lifespan of the cartridge, in order to calculate the exhaustion of the cartridge according to the first of the two events (exhaustion of time from the first activation—counting of the filtered water) that is verified.

Carafes capable of calculating the exhaustion of the cartridge according to the quality of the water treated are not currently known

SUMMARY

A main objective of the invention is to provide a method of determination of the conditions of exhaustion of a filter cartridge for filtering carafes with replaceable cartridge in which the condition of exhaustion is established in an accurate and reliable manner.

Another objective of the invention is to provide a filtering carafe with a replaceable cartridge operating in compliance with said method and at the same time built in a simple and functional way.

Another objective of the findings is to provide a carafe that, in one single device, incorporates all of the indicators desired for an accurate determination of the conditions of exhaustion of the cartridge.

These objectives and more, which will be described in further detail here below, are achieved from a carafe made in compliance with the following claims.

The characteristics and the advantages of the invention are described in the detailed description of some illustrative examples of activation, provided purely as an indicative and not restricted example, in the drawings attached.

DESCRIPTION OF THE PREFERRED EMBODIMENTS

Figure 1:
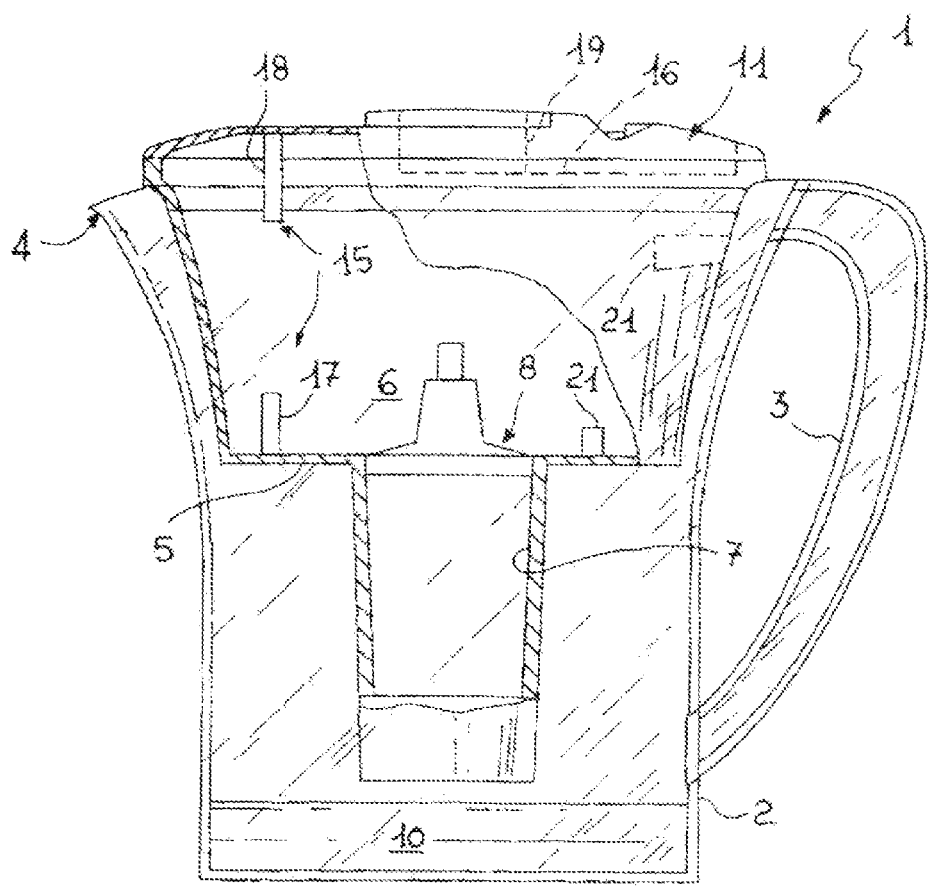
FIG. 1 is a schematic view in cross section of a filtering carafe according to the invention.
Figure 2:
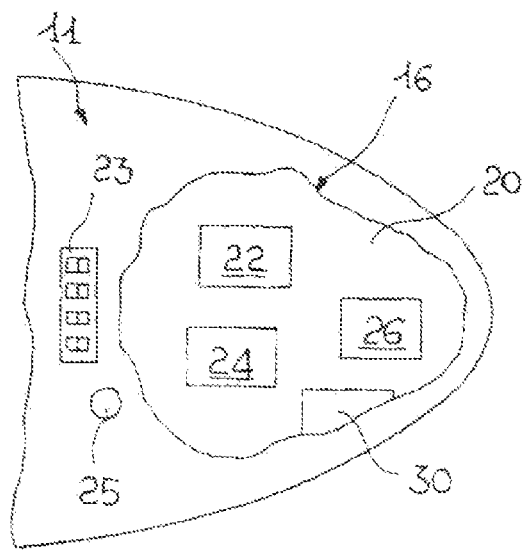
FIG. 2 is a schematic plan view from above of the carafe in FIG. 1 in a partial section.

In the figures, FIG. 1 indicates on the whole a filtering carafe including a container 2 with a handle 3 and an opposite pouring spout 4. Container 2 holds a removable feedbox 5 in which the first basin 6 is defined, destined for collection of water to be filtered, the bottom of which has an open discharge conduit 7 destined to hold a filtering cartridge 8 of a replaceable kind. Container 2 also holds a second basin 10 for collection of the filtered water.

Figure 3:
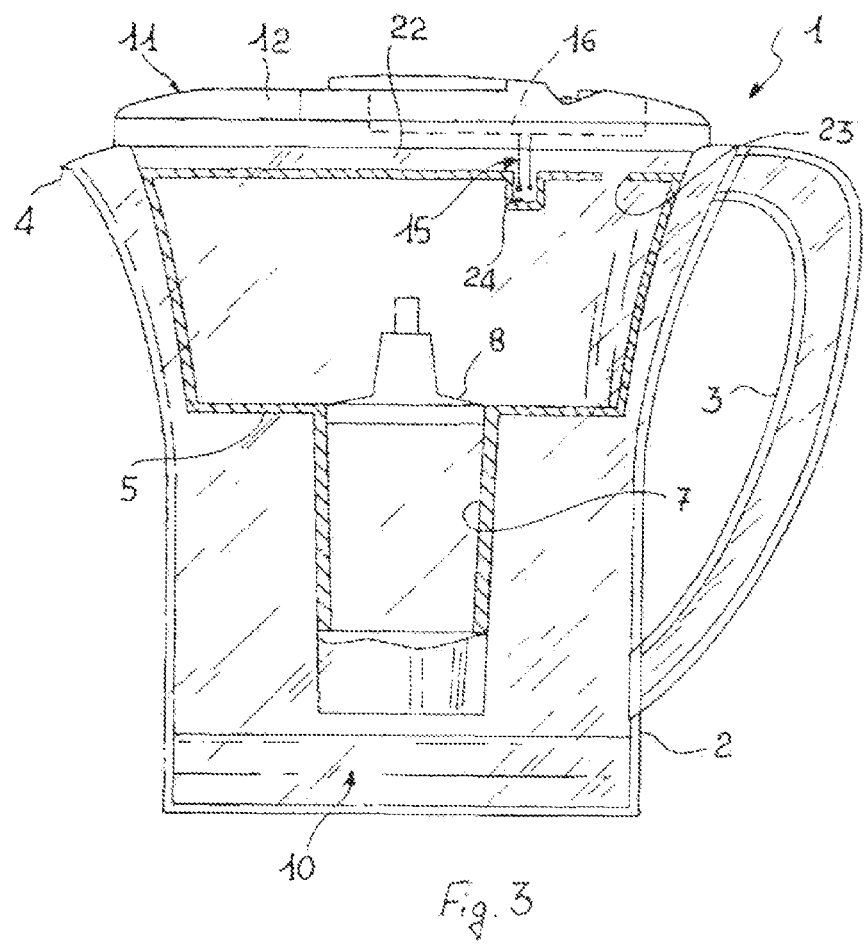
FIG. 3 is a schematic view in cross section of a second example of carafe according to the invention.
Figure 4:
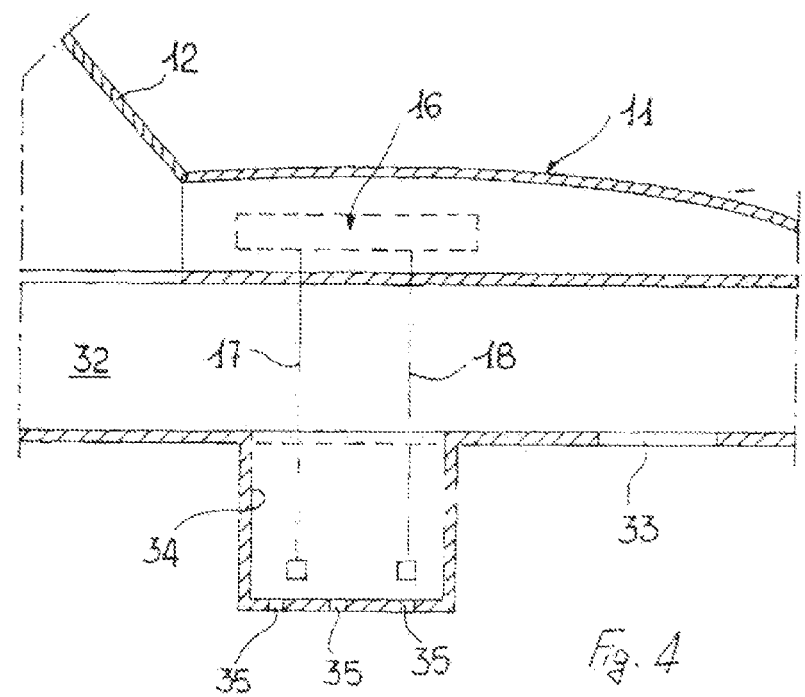
FIG. 4 is a schematic view in cross section in an enlarged scale of a detail of the carafe of FIG. 3.

Container 2 is closed by a removable cover 11 which may be fitted with an open top 12 (FIGS. 3 and 4) in order to fill the first basin 6.

The water treatment process is carried out by introducing the water to be filtered into the first basin, so that the water flows through the conduit 7 through the filter bed that is located in the cartridge 8 and passes onto the second basin.

In order to establish the lifespan of the cartridge 8, after which time the cartridge should be considered exhausted and therefore should be replaced with a new cartridge, the first basin includes an impedance measurer (of the water to be filtered) operatively connected to calculation means of the conditions of exhaustion of the cartridge. The impedance measurer is generally indicated by 15 and the calculations means are generally indicated by 16.

The impedance measurer includes at least two electrodes 17, 18 which are fitted in the first basin 6 and between which an electric circuit can be closed in the presence of water to be filtered. It is preferable that measuring is carried out in direct current, generated by a small accumulator 19, and therefore the impedance measured is equal to the electrical resistance of the water to be filtered. As well as measuring the conductivity of the water to be filtered, the value of which is correlated to the concentration of ions and as such affects the lifespan of the filtering cartridge 8, the electrodes 17, 18 are also used as counting means to identify the number of times the first collection basin is filled and the consequent amount of water already filtered. In order to do so it is preferable that measures are made to prevent that simple shaking of the carafe 1 may lead to the creation of a counting signal following temporary immersion of the two electrodes and subsequent closing of the electrical circuit between them.

An initial trick (FIG. 1) lies in the position of the electrode 17 close to the bottom of the first basin 6 while the electrode 18 is placed close to the cover 11. Furthermore, in addition to the two measuring electrodes 17, 18 two consent electrodes 21 are also provided, with the task of identifying contemporarily with the measuring electrodes the state of submersion in the water to be filtered and therefore to confirm that the submersion of the electrodes 17, 18 has not been accidentally provoked by movement of the carafe.

An alternative is provided (FIGS. 3 and 4) in which the two electrodes 17, 18 are fitted onto the cover and extended into a filling conduit 32 which flows into the basin 6 at the opening point 33. The electrodes 17, 18 are preferably contained, at least partially, in a chamber 34 the bottom of which contains passages 35 suitably created in terms of dimension in order to time the emptying of the chamber 34 compared with a minimum predefined period of time. This avoids that simple temporary accidental submersions of the electrodes due to movements of the carafe may generate false calculations. The result is achieved by defining a minimum period of time of submersion of the electrodes which exceeds a time limit established so that the signal generated is received as effective by the counting means 16. As a pure example, considering that the dimension of the passages 35 is such that the water contained in the chamber 34 flows in a time ×1 of 30 seconds and that the entire filling chamber and the collection basin 6 are filled in a minimum period of time ×2 of 10 seconds, the minimum time for contact between water and the electrodes 17, 18 is defined in ×1+×2=40 seconds. Therefore, a limit may be defined for means of calculation in such a way that only closing signals of the circuit that exceed or are equal to a period of 40 seconds are considered. Signals that last less than 40 seconds will be ignored.

The electrodes 17, 18, 21 derive from a circuit 20 powered by the accumulator 19 and includes counting means 22 to count the filling cycles of the said first basin and furthermore includes a display 23 susceptible to highlight important information of the filtering cycles carried out and/or the residual lifespan of the cartridge 8.

The circuit 20 includes timers 24 to measure the amount of time that has passed from initial use of the cartridge and to calculate the amount of time left until its exhaustion and signal means 25, such as a visual LED alarm and/or a buzzer or other kind of sound signal, to inform the user of exhaustion of the filtering cartridge.

The means 17, 18, 21 identify closing of the circuit 20 during each new filling of the first basin 6 and at the same time false indications of closing of the circuit 20 following accidental submersion of the electrodes 17, 18, 21 are avoided.

In alternative or in addition to the means indicated above, circuit 20 includes a timer 26 activated upon each closing of the circuit 20 in order to exclude counting if the duration of the afore-mentioned closing extends for an amount of time lower than the limit value predefined.

The timer 26 therefore acts as a signal excluder device susceptible to accepting identification only if it extends beyond the predefined time limit. The erection of a pair of watertight panels aimed at creating a labyrinth passage to prevent accidental closing of the circuit in the absence of effective filling of the first basin 6 is also provided for between the measuring electrodes 17, 18.

The signals measured by the electrodes 17, 18, 21, the counting means 22 and the timers 24, 26 are fed to an input of a microprocessor 30 that, on the basis of a resident programme, elaborates important data on the lifespan of the cartridge according to the amount of time passed since its first activation and the amount of water treated, identified in terms of closure considered important by the circuit between the electrodes, and by the ionic concentration of the pollutants, identified in terms of conductivity of the water being treated. The important data calculated in this way is visualized, preferably in terms of a "count-down", on the display 23 which indicates the number of cycles remaining until exhaustion of the cartridge 8.

Figure 5:
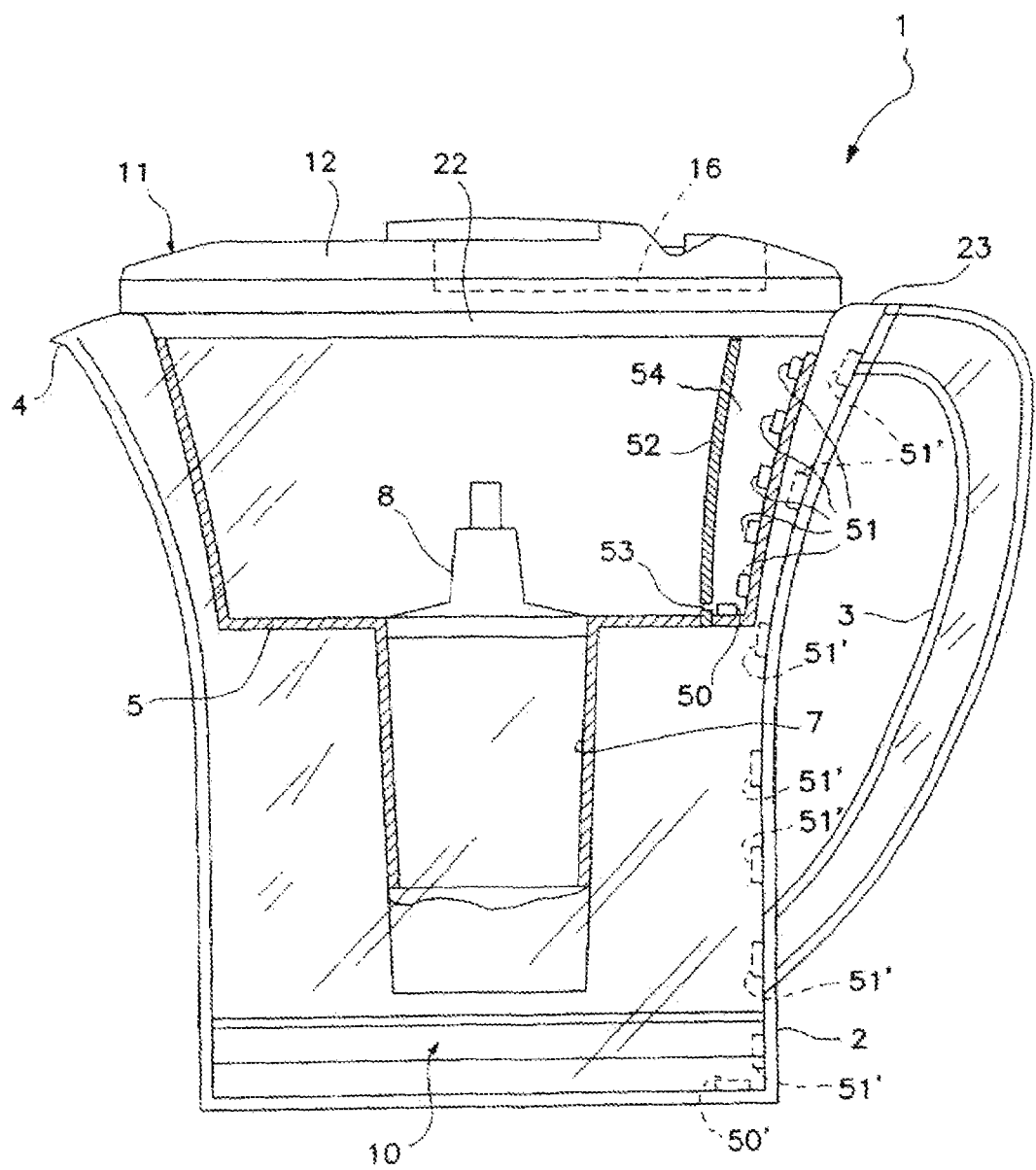
FIGS. 5 and 6 are schematic views in cross section of two different embodiments of the invention.

FIG. 5 illustrates another example of this present invention. Similar details are marked using the same numerical references as the previous figures.

The example of FIG. 5 is rather useful to take into consideration, in the calculation of exhaustion of the cartridge 8, of partial fillings of the first collection basin 6.

In this, there are numerous electrodes 51 located on growing levels in a compensation chamber 54 defined within the first basin 6 by a watertight panel 52. The watertight panel 52 carries, close to the bottom, a gauged opening 53 with the objective of minimizing level variations in the compensation chamber following oscillations of the carafe typically when it is inclined for pouring.

The electrodes of level 51 are associated with a reference electrode 50, also located at the bottom of the compensation chamber.

The electrodes 50, 51 are associated with corresponding branches of the measuring circuit of impedance so as to close the corresponding branch once the corresponding level of water in the basin is reached.

Even if the electrodes 51 with relative compensation chamber are represented in the upper basin 6 of the carafe in FIG. 5, such electrodes may also be placed in addition, or in alternative to the second basin 10 alternatively to the configuration described above. This second technical solution is illustrated in FIG. 5 by dotted lines. The specific numerical references are indicated with a superscript.

When the electrodes 50' and 51' are fitted exclusively to the collection basin of filtered water, reading of the impedance measurer provides an important value of the quality of filtered water, suggesting replacement of the cartridges when said quality falls below acceptable values.

When the electrodes 50', 51' or at least one of them (as well as the reference electrode 50 or 50') are fitted to both basins, reading of the impedance measurer provides an important value of the ratio between the quality of the water to be filtered and of the water filtered. Said value is therefore a direct index of the residual efficiency of the cartridge when measuring is carried out and highlights the capacity of the cartridge to carry out other filters or the need for replacement.

Figure 6:
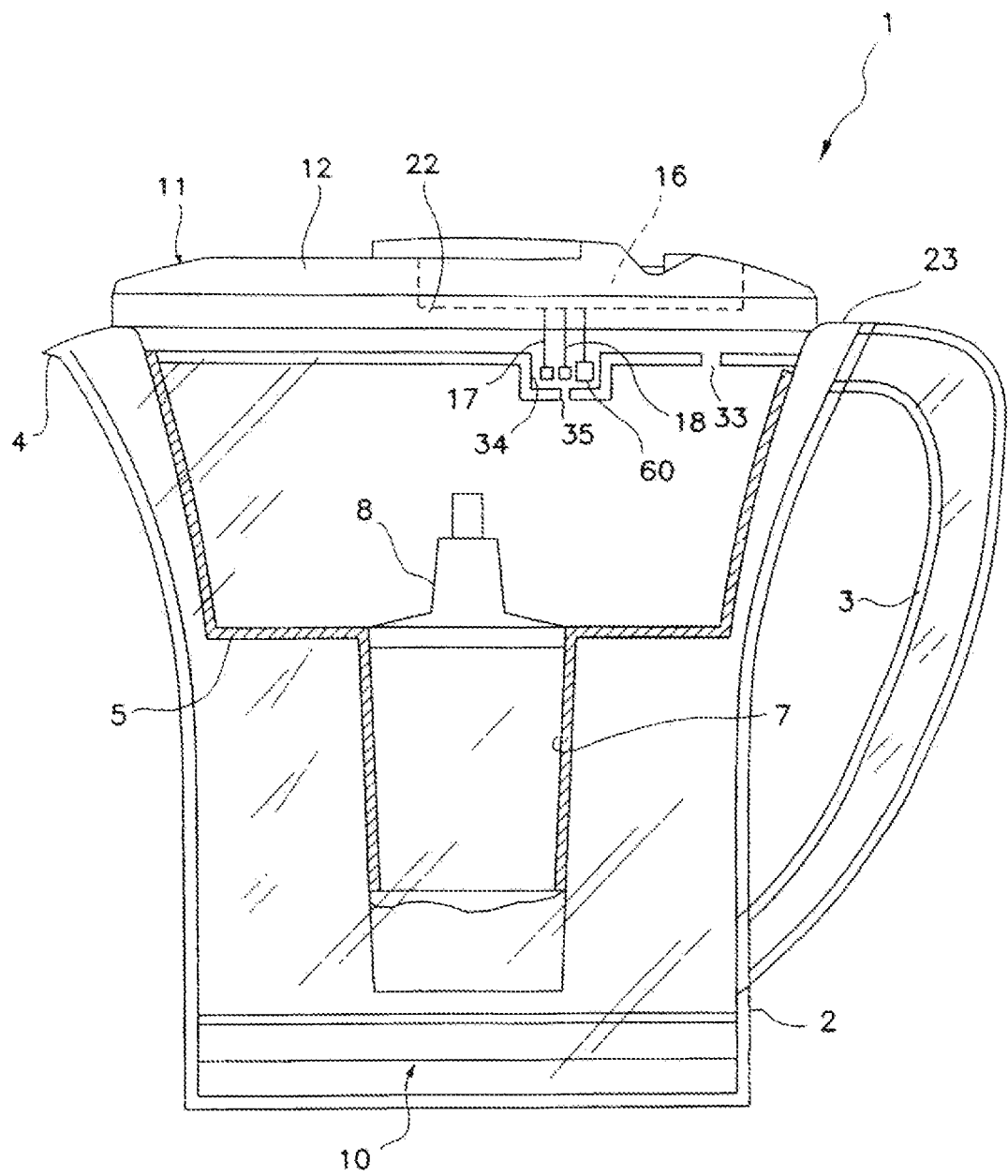

Another example is described with reference to FIG. 6 where, in chamber 34, in addition to the electrodes 17, 18 a temperature sensor of the water to be filtered indicated with 60 is provided for.

Said sensor may alternatively be placed in the lower basin 10, as long as the temperature of the water to be filtered is not subject to appreciable variations.

The temperature measured is sent to the calculation means 16 and is used to correct the calculation of the conditions of exhaustion of the cartridge according to the temperature measured. In fact as the temperature increases a corresponding increase in electric conductivity measure due to a variation in the ionic concentration entirely in the solution is expected.

The invention described in this way includes numerous advantages compared with the technical notes indicated. They include:

greater simplicity in terms of construction as it does not include moving parts;

greater control of the lifespan of the filtering cartridge which may be used completely but is always capable of guaranteeing an efficient level of filtering of the water treated; and lower costs of the carafe as the solution adopted, with the same level of control of the efficiency of filtering, can be made with a huge economic advantage.

The invention claimed is:

1. A method comprising:
   providing a filtering carafe and a replaceable filtering cartridge;
   calculating at least one parameter using at least one electrode pair within and fitted onto a cover of the filtering carafe, wherein the at least one electrode pair is positioned in the filtering carafe upstream from the replaceable filtering cartridge; and
   determining a lifespan of the filtering cartridge using the at least one parameter;
   wherein the at least one parameter calculated using at least one electrode pair, is calculated based on at least one condition of exhaustion selected from quality of water to be filtered and a number of filtering cycles carried out from initial activation of the filtering cartridge.

2. A method comprising:
   providing a filtering carafe comprising at least one electrode pair fitted onto a cover of the filtering carafe;
   providing a replaceable filtering cartridge;
   calculating a number of filtering cycles carried out from initial activation of the replaceable filtering cartridge using the at least one electrode pair; and
   determining a lifespan of the replaceable filtering cartridge using the number of filtering cycles.

3. The method of claim 2, wherein the number of filtering cycles comprises a number of filling cycles as determined by a current flowing through water in the carafe closing a circuit between the at least one electrode pair.

4. The method of claim 2, wherein the at least one electrode pair is positioned within the carafe to avoid accidental submersions of the electrodes due to movement of the carafe.

5. The method of claim 2, further comprising determining whether a circuit between the electrode pair has been closed or opened for at least a predefined period of time before counting each filtering cycle.

6. A system comprising:
   a filtering carafe having at least one electrode pair fitted onto a cover of the filtering carafe;
   a replaceable filtering cartridge, wherein said filtering carafe is adapted to receive the replaceable filtering cartridge; and
   a counting means adapted to count a number of filtering cycles carried out in the filtering carafe from an initial activation of the replaceable filtering cartridge, using the at least one electrode pair.

7. The system of claim 6, wherein the number of filtering cycles comprises a number of filling cycles as determined by a current flowing through water in the carafe closing a circuit between the at least one electrode pair.

8. The system of claim 6, wherein the at least one electrode pair is positioned within the carafe to avoid accidental submersions of the electrodes due to movement of the carafe.

9. The system of claim 6, further comprising a display.

10. The system of claim 6, further comprising a signal means to indicate exhaustion of the filtering cartridge.

11. The system of claim 6, further comprising a timer adapted to activate upon closing of a circuit, and adapted to exclude counting if duration of the closing is for an amount of time lower than a predefined time limit.

12. The system of claim 11, further comprising a microprocessor into which signals generated by a timer may be fed, to determine data regarding a lifespan of the cartridge.

13. The system of claim 6, further comprising a microprocessor into which signals generated by at least one of the electrode pairs and counting means may be fed, to determine data regarding a lifespan of the cartridge.

14. A filtering carafe comprising:
    at least one electrode pair fitted onto a cover of the filtering carafe;
    a first collection basin;
    a second collection basin, wherein the filtering carafe is adapted to receive a replaceable filtering cartridge between said first basin and said second collection basin, and wherein the filtering carafe is adapted to receive a liquid and expose the liquid to the at least one electrode pair during a filtering cycle, before the liquid passes from the first collection basin through the replaceable filtering cartridge into the second collection basin;
    a calculation means adapted to determine filtering cycles by receiving signals from the at least one electrode pair upon exposure of the at least one electrode pair to the liquid; and
    a signal means adapted to inform a user of the filtering carafe of exhaustion of the replaceable filtering cartridge based on the filtering cycles.

15. The filtering carafe of claim 14, wherein the signal means is adapted to inform a user of remaining uses of the replaceable filtering cartridge before exhaustion of the replaceable filtering cartridge.

16. The filtering carafe of claim 14, wherein the signal means is adapted to inform a user of an amount that the replaceable filtering cartridge has been used since initial activation of the replaceable filtering cartridge.

17. The filtering carafe of claim 14, wherein the number of filtering cycles comprises a number of filling cycles as determined by a current flowing through water in the carafe closing a circuit between the at least one electrode pair.

18. The filtering carafe of claim 14, wherein the at least one electrode pair is positioned within the filtering carafe to avoid accidental submersions of the electrodes due to movement of the carafe.

19. The filtering carafe of claim 14, further comprising a timer adapted to activate upon closing of a circuit, and adapted to exclude counting if the duration of the closing is for an amount of time lower than a predefined time limit.

20. The filtering carafe of claim 14, wherein the signal means comprises a display of a relative amount of use of the replaceable filtering cartridge since initial activation of the replaceable filtering cartridge, or uses remaining before exhaustion of the replaceable filtering cartridge.

21. A method comprising:
    providing a filtering carafe;
    recording a signal generated by at least one electrode pair incorporated into a cover of the filtering carafe upon the at least one electrode pair contacting a liquid during a filtering cycle, before the liquid passes from a first collection basin of the filtering carafe, through a replaceable filter cartridge, and into a second collection basin of the filtering carafe; and calculating, using a microprocessor, a number of filtering cycles carried out since initial activation of the replaceable filtering cartridge based on the recorded signals.

22. The method of claim 21, further comprising providing a signal to a user of the filtering carafe to inform the user of relative exhaustion of the replaceable filtering cartridge based the number of filling cycles carried out since initial activation of the replaceable filtering cartridge.

23. A method comprising:
providing a filtering carafe and a replaceable filtering cartridge;
calculating at least one parameter using at least one electrode pair within and fitted to the carafe, wherein the at least one electrode pair is positioned in the filtering carafe upstream from the replaceable filtering cartridge; and
determining a lifespan of the filtering cartridge using the at least one parameter;
wherein the at least one parameter calculated using at least one electrode pair, is calculated based on at least one condition of exhaustion selected from quality of water to be filtered and a number of filtering cycles carried out from initial activation of the filtering cartridge;
said method further comprising determining a current between at least one pair of consent electrodes to confirm that a closing or opening of a circuit between the at least one electrode pair has not been accidentally provoked by movement of the carafe.

24. A method comprising:
providing a filtering carafe comprising at least one electrode pair;
providing a replaceable filtering cartridge;
calculating a number of filtering cycles carried out from initial activation of the replaceable filtering cartridge using the at least one electrode pair;
determining a lifespan of the replaceable filtering cartridge using the number of filtering cycles; and
determining a current between at least one pair of consent electrodes to confirm that a closing or opening of a circuit between the at least one electrode pair has not been accidentally provoked by movement of the carafe.

25. A system comprising:
a filtering carafe having at least one electrode pair;
a replaceable filtering cartridge, wherein said filtering carafe is adapted to receive the replaceable filtering cartridge;
a counting means adapted to count a number of filtering cycles carried out in the filtering carafe from an initial activation of the replaceable filtering cartridge, using the at least one electrode pair; and
at least one pair of consent electrodes adapted to confirm that a closing or opening of a circuit between the at least one electrode pair has not been accidentally provoked by movement of the carafe.

26. A filtering carafe comprising:
at least one electrode pair;
a first collection basin;
a second collection basin, wherein the filtering carafe is adapted to receive a replaceable filtering cartridge between said first basin and said second collection basin, and wherein the filtering carafe is adapted to receive a liquid and expose the liquid to the at least one electrode pair during a filtering cycle, before the liquid passes from the first collection basin through the replaceable filtering cartridge into the second collection basin;
a calculation means adapted to determine filtering cycles by receiving signals from the at least one electrode pair upon exposure of the at least one electrode pair to the liquid;
a signal means adapted to inform a user of the filtering carafe of exhaustion of the replaceable filtering cartridge based on the filtering cycles; and
at least one pair of consent electrodes adapted to confirm that a closing or opening of a circuit between the at least one electrode pair has not been accidentally provoked by movement of the carafe.

27. A method comprising:
providing a filtering carafe;
recording a signal generated by at least one electrode pair in the filtering carafe upon the at least one electrode pair contacting a liquid during a filtering cycle, before the liquid passes from a first collection basin of the filtering carafe, through a replaceable filter cartridge, and into a second collection basin of the filtering carafe;
calculating, using a microprocessor, a number of filtering cycles carried out since initial activation of the replaceable filtering cartridge based on the recorded signals; and
determining a current between at least one pair of consent electrodes to confirm that a closing or opening of a circuit between the at least one electrode pair has not been accidentally provoked by movement of the carafe.

* * * * *